United States Patent Office 3,347,895
Patented Oct. 17, 1967

3,347,895
PROCESS FOR PREPARING CYCLIC ORGANOSILOXANES
George M. Omietanski, Tonawanda, and Thomas C. Williams, Lancaster, N.Y., assignors to Union Carbide Corporation, a corporation of New York
No Drawing. Filed Apr. 29, 1963, Ser. No. 276,152
12 Claims. (Cl. 260—448.2)

This invention relates to a process for preparing cyclic organosiloxanes of specific desired composition having mixed organo-substituents. More particularly, it relates to a process of preparing cyclic organosiloxanes having mixed organo-substituents by reacting in the presence of an inert solvent an organosilicon diol compound with a difunctional organosilicon compound containing at least one organo-substituent different from the organo-substituents of the diol compound.

Organosiloxanes having mixed organo-substituents and especially cyclic organosiloxanes containing mixed organo-substituents have been known in the art, but it was difficult to obtain such compounds having specific desired compositions in useful quantities. The preparation procedures for such compounds, as illustrated by the reaction between an alkoxy-endblocked polysiloxane and a silane diol, were extremely slow in reaction rates with attendant low yields. If catalysts were employed to increase the reaction rate, such catalysts would cause rearrangement of the organosilicon molecules and thus reduce the yield of desired products.

We have now found that cyclic organosiloxanes of specific desired composition having mixed organo-substituents can be conveniently prepared by reacting in the presence of an inert solvent an organosilicon diol compound with an organosilicon compound containing at least one organo-substituent different from the organo-substituents of the diol compound and also containing two monovalent radicals attached to silicon selected from the class consisting of chloro and alkylamino radicals. One of the reactants must be a siloxane and the other reactant must be a silane.

More particularly, the novel process of the present invention comprises reacting in the presence of an inert solvent (1) organosilicon diol compound selected from the class consisting of siloxane compounds having the formula $HO(R_2SiO)_nH$ and silane compounds having the formula $R_a^1R_b^2Si(OH)_2$ wherein R, $R^1$ and $R^2$ are radicals selected from the class consisting of monovalent hydrocarbyl radicals connected to silicon through a carbon-silicon bond and monovalent substituted hydrocarbyl radicals containing substituents free of active hydrogen, said monovalent substituted hydrocarbyl radicals connected to silicon through a carbon-silicon bond and having the substituents located at least two carbon atoms from the silicon atom and wherein $R^1$ and $R^2$ can be the same or different radicals but at least one $R^1$ or $R^2$ radical is different from R, $a$ is an integer having a value from 0 to 2 inclusive, $b$ is an integer having a value from 0 to 2 inclusive, the sum of $a+b$ is 2, and $n$ is an integer having a value from 2 to 4 inclusive with (2) an organosilicon compound selected from the class consisting of siloxane compounds having the formula $$X(R_2SiO)_mSiR_2X$$

and silane compounds having the formula $R_a^1R_b^2SiX_2$ wherein R, $R^1$, $R^2$, $a$ and $b$ are the same as defined above, $m$ is an integer having a value from 1 to 3 inclusive, X is a monovalent radical selected from the class consisting of chloro and alkylamino radicals, and the sum of $a+b$ is 2, wherein one of the reactants must be a siloxane and the other reactant must be a silane, and recovering the desired cyclic organosilicon product.

The organosilicon diol compounds of the formulas $HO(R_2SiO)_nH$ and $R_a^1R_b^2Si(OH)_2$ employed in the process of this invention can be prepared by well known techniques. The $R_a^1R_b^2Si(OH)_2$ type compounds can be prepared by controlled hydrolysis of organochlorosilanes, for example. The $HO(R_2SiO)_nH$ type compounds can be prepared by careful hydrolysis of chlorosiloxanes having the formula $Cl(R_2SiO)_mSiR_2Cl$ wherein R and $m$ are as defined above.

The monovalent hydrocarbyl radicals which constitute R, $R^1$ and $R^2$ in the above formulas are illustrated by alkyl groups, such as methyl, ethyl, propyl, isopropyl, butyl, isobutyl, amyl, hexyl and the like; alkenyl groups, such as vinyl, alkyl and the like; alicyclic groups, such as cyclopentyl, cyclohexyl and the like; aryl groups, such as phenyl, naphthyl and the like; aralkyl groups, such as benzyl, phenylethyl and the like; and alkaryl groups, such as tolyl, ethylphenyl, xylyl, mesityl and the like.

The monovalent substituted hydrocarbyl radicals containing substituents free of active hydrogen wherein the substituents are located at least two carbon atoms from the silicon atom which constitute R, $R^1$ and $R^2$ in the above formulas are illustrated by substituted alkyl groups, such as beta-cyanoethyl, gamma-cyanopropyl, delta-nitrobutyl, and the like; substituted alkenyl groups, such as 3-cyano-2-propenyl, 4-nitro-2-butenyl, and the like; substituted aryl groups, such as ortho-cyanophenyl, meta-nitrophenyl and the like; substituted alicyclic groups, such as 2-cyanocyclopentyl, 3-nitrocyclohexyl, and the like; substituted aralkyl groups, such as ortho-cyanobenzyl, meta-nitrophenylethyl and the like; and substituted alkaryl groups, such as beta-cyanoethylphenyl, ortho-nitrotolyl, and the like. Further examples of useful substituents free of active hydrogen are tertiary-amino, alkyl-ester and alkoxy-alkyl groups.

The silicon-containing compounds of the formulas $$X(R_2SiO)_mSiR_2X$$

and $R_a^1R_b^2SiX_2$ employed in the process of this invention can likewise be prepared by well known techniques. Compounds of the type $R_a^1R_b^2SiX_2$ wherein X are chloro radicals can be prepared by reaction between organochlorides and silicon to form organochlorosilanes. Other known techniques can be employed to form silanes having alkylamino substituents. $R_2^1SiX_2$ type compounds wherein X is alkylamino can be prepared by reaction of $R_2^1SiCl_2$ with excess amine. The $X(R_2SiO)_mSiR_2X$ type compounds can be prepared, for example, by controlled hydrolysis of $R_2SiX_2$ compounds in a limited amount of water.

The monovalent hydrocarbyl radicals and monovalent substituted hydrocarbyl radicals which constitute R, $R^1$ and $R^2$ in the above $X(R_2SiO)_mSiR_2X$ and $R_a^1R_b^2SiX_2$ formulas are the same as those described above for the compounds having the formulas $HO(R_2SiO)_nH$ and $$R_a^1R_b^2Si(OH)_2$$

The alkylamino radicals which constitute X in the above formula are illustrated by diethylamino, methylpropylamino and the like.

The overall process of the present invention can be further described by reference to the following equation which illustrates the reaction between an organosiloxane diol and a difunctional silane.

$$R_2^1SiX_2 + HO(R_2SiO)_nH \rightarrow (R_2^1SiO)(R_2SiO)_n + 2HX$$

The product from this reaction is a cyclic organosiloxane.

The functional constituents of the reactants can be interchanged whereby a silane diol can react with a difunctional organosiloxane. This is shown by the following equation.

$$R_2{}^1Si(OH)_2 + X(R_2SiO)_mSiR_2X \rightarrow (R_2{}^1SiO)(R_2SiO)_n + 2HX$$

The product from this reaction is also a cyclic organosiloxane.

It is understood that varying the stoichiometric ratio of reactants in the above equations can produce other side products. It is preferred to use the molar amounts of reactants as shown above.

Whenever a chlorosilane or chlorosiloxane is employed in the process of the present invention, hydrogen chloride will be formed. It is necessary to remove the HCl as soon as possible in order to prevent undesirable side reactions such as condensation of the silanol or siloxane diol to higher molecular weight polymers. An HCl acceptor, such as triethylamine, is preferably used to react with the HCl and thus promote the primary desired reaction. Other HCl acceptors could alternatively be used as long as they do not promote undesirable side reactions.

Where the use of HCl acceptors is not desirable, the process can be performed under conditions which minimize solubility of hydrogen chloride in the reaction medium. This can be accomplished, for example, by operating at the boiling point of the reaction system or by blowing an inert gas, such as dry nitrogen, through the reaction system. The use of a reaction solvent, such as carbon tetrachloride, in which HCl has a low solubility can also be beneficial toward maintaining satisfactory yield of desired products.

An organic solvent is necessarily employed in the process of the present invention. When an amine HCl acceptor is employed in this process, a solvent helps maintain a desirably low viscosity of the reaction mixture by counteracting the thickening effect of the precipitated amine hydrochloride. Examples of useful solvents are acetone, benzene, xylene, carbon tetrachloride, tetrahydrofuran and even an excess of the amine HCl acceptor, but other known solvents for organosilicon compounds could also be employed. The solvent must be such that both reactants are soluble in it and that it is inert to the reactants and products. The solvent can be present in any desired amount. It is preferred that the solvent be present in a volume amount of from about 25 to about 80 volume percent based on total volume of solvent plus reactants.

The reaction conditions for carrying out the process of this invention are not narrowly critical. The reaction temperature can be carried out at temperatures from below about 0° C. to about 200° C. The upper temperature limit of the reaction is, in general, the reflux temperature of the reactants-solvent-acid acceptor mixture. The preferred temperature range for the reaction is from about 0° C. to about 150° C. The process can be conveniently carried out at atmospheric pressure. However, in some instances, especially when low boiling reactants or low boiling solvents are used, the process can be run with advantage at pressure higher than atmospheric. A tertiary amine promoted reaction between a siloxane diol and a chlorosilane is very rapid. The highly exothermic reaction takes place at 20° C. about as fast as the reactants can be brought together.

Mixed cyclic organosiloxanes derived by the process of the present invention are useful for preparing higher polymers, particularly organosilicon gumstocks. This is especially true for mixed cyclic trimers or tetramers containing dimethyl substitution and other organo substitution. Because of their high dimethylsiloxane content, they are frequently liquids or low melting solids which are completely miscible with cyclic dimethylsiloxane tetramer at or near room temperature. These mixtures of mixed cyclic trimers or tetramers and cyclic dimethylsiloxane tetramer produce gumstocks of consistently superior processing quality as compared to gumstocks prepared by equilibration or mixing, for example, of cyclic dimethylsiloxane tetramer and a cyclic siloxane tetramer containing only the other organo radicals. The mixed cyclic tetramers produced by the process of this invention can thus be widely used to introduce groups such as beta-phenylethyl, beta-phenylpropyl, gamma-cyano-gamma-methyl-butyl, nitrophenyl and the like into copolymer gumstocks.

The mixed cyclic organosiloxane tetramers, for example, produced by the process of the present invention can be polymerized by themselves by well known techniques to form high molecular weight organosilicon gumstocks. This is very useful for producing compositions containing organofunctional groups which are otherwise difficult to obtain in a form suitable for polymerization.

The process of the present invention will be further described by reference to the following examples. In these examples the expression "Me" signifies the methyl radical "CH$_3$." Likewise, the expression "$\phi$" signifies the phenyl radical "C$_6$H$_5$."

*Example 1*

In a 5-liter, 3-necked flask, equipped with a stirrer, a means of maintaining a dry atmosphere and two 500-ml. addition funnels, was placed in a solution of 275 grams (2.72 moles) of dry triethylamine in 800 ml. of benzene. The flask was cooled with a solid carbon dioxide-acetone bath and by means of the two addition funnels a solution of 344 grams (1.36 moles) of freshly distilled diphenyldichlorosilane ($\phi_2SiCl_2$) in 500 ml. of benzene and a solution of 326 grams (1.36 moles) of dimethylsiloxane trimer diol [HO(Me$_2$SiO)$_3$H] in 500 ml. of benzene were simultaneously added to the flask. The two solutions were added rapidly with vigorous stirring. The time of addition was 0.25 hr. and at no time did the temperature in the flask exceed 5° C. The resulting slurry was allowed to warm to ambient temperature overnight. About 500 ml. of water were added and the basic aqueous solution was separated from the upper benzene layer. This benzene layer was washed with distilled water several times until the washings were neutral. The benzene layer was then dried over anhydrous calcium sulfate, filtered, stripped of solvent and fractionated. Fractional distillation resulted in 264 grams (0.63 mole) of high purity cyclic tetramer having the formula [($\phi_2$SiO)(Me$_2$SiO)$_3$]. The yield was 46 mole percent based on moles of reactants employed. The mixed cyclic tetramer had the following properties:

B.P. 120–1° C./0.25 mm. mercury, index of refraction of $n_D{}^{25}=1.4900$; density of $d_{25}=1.056$ g./ml.

Calculated for C$_{18}$H$_{28}$Si$_4$O$_4$: 51.4% C, 6.7% H, 26.6% Si; molecular weight=421, molar refraction of $$MR_D = 114.2$$

Found: 51.3% C, 6.6% H, 26.1% Si; molecular weight=416, MR$_D$=115.1.

If the relative dilution of the reaction mixture with benzene was increased by about a factor of 2, the yield of desired product increased to about 75 mole percent based on moles of reactants used. The mixed cyclic ($\phi_2$SiO)(Me$_2$SiO)$_3$ has also been prepared in about the same yield by adding a benzene solution of HO-(Me$_2$SiO)$_3$H to a solution of $\phi_2$SiCl$_2$ and triethylamine in benzene.

*Example 2*

Using the same type of reaction vessel as described in Example 1 above, a solution of 199 grams (0.82 mole) of HO(Me$_2$SiO)$_3$H in 400 ml. of tetrahydrofuran and a solution of 210 grams (0.82 mole) of $\phi_2$SiCl$_2$ in 400 ml. of tetrahydrofuran were added at the same time by means of two addition funnels to a solution of 167 grams (1.65 moles) of triethylamine in 500 ml. of tetrahydrofuran. The contents were maintained at about 0° C. during the addition time of 1.5 hours. The reaction mixture was quenched into excess distilled water, the organo-siloxane layer was dried and vacuum distilled. There was obtained 267 grams (77 mole percent yield based on moles of reactants used) of a cyclic tetramer having the formula ($\phi_2$SiO)(Me$_2$SiO)$_3$. This product had the properties of:
 B.P.=120–125° C./0.4–0.5 mm. mercury;

$$n_D^{25} = 1.4908$$

This yield is comparable to that obtained when benzene is used as a solvent.

*Example 3*

To a one-liter, 3-necked flask equipped with a fritted glass bubbling tube and a magnetic stirrer was added a solution of 81 grams of $\phi_2$Si[N(C$_2$H$_5$)$_2$]$_2$ (0.25 mole) containing (C$_2$H$_5$)$_2$NH·HCl in 300 ml. of xylene. A vigorous stream of nitrogen was passed through the mixture as a solution of 60 grams (0.25 mole) of HO(ME$_2$SiO)$_3$H in 300 ml. of xylene was added over a period of two hours at ambient temperature. The reaction was very slow. The mixture was stirred with nitrogen passing through the solution for an additional 20 hours and then the temperature was raised to 50° C. and dry nitrogen was passed through the solution for another 72 hours. At the end of this period (C$_2$H$_5$)$_2$NH was still being slowly evolved. The mixture was cooled, filtered free of precipitated diethylamine hydrochloride and the residue fractionally distilled. There was obtained 70 grams (51 mole percent yield based on moles of reactants used) of crude cyclic tetramer having the formula ($\phi_2$SiO)(Me$_2$SiO)$_3$ and having the properties of:
 B.P.=120–130° C./0.25 mm. mercury; $n_D^{25}$=1.4890.
 Calculated for C$_{18}$H$_{28}$Si$_4$O$_4$: 51.4% C, 6.7% H, 26.6% Si, molecular weight=421. Found: 49.6% C, 6.3% H, 25.9% Si, molecular weight=409.

The above Examples 1–3 all employed a siloxane diol and a silane containing chloro or alkylamino substituents. The following Example 4 describes a process employing a silane diol and a siloxane containing chloro radicals.

*Example 4*

The apparatus and general procedure were the same as described in Example 1 above. Solutions of 100 grams (0.36 mole) of ClSiMe$_2$OSiMe$_2$OSiMe$_2$Cl in 180 ml. of tetrahydrofuran and 78 grams (0.36 mole) of $\phi_2$Si(OH)$_2$ in 230 ml. of tetrahydrofuran were added simultaneously to a solution of 73 grams (0.72 mole) of triethylamine in 180 ml. of tetrahydrofuran. The addition took place over a 45 minute period while the reaction mixture was maintained at about 0° C. The product mixture was filtered, stripped of solvent and the residue was fractionally distilled. There was thus obtained 121 grams (80 mole percent yield based on moles of reactants used) of a cyclic tetramer having the formula ($\phi_2$SiO)(Me$_2$SiO)$_3$ having the property of $n_D^{22}$=1.4909.

The above examples all employed organotrisiloxanes as one of the reactants. This resulted in cyclic tetramer organosiloxane products. This invention is also applicable to the use of organodisiloxanes to produce cyclic trimer products and to the use of organotetrasiloxanes to produce cyclic pentamer products. The following examples describe these process variations.

*Example 5*

One liter of dry tetrahydrofuran containing triethylamine (1010 g., 2.0 moles) was placed in a 5-liter, 3-necked flask equipped with a stirrer, thermometer and two addition funnels. Diphenylsilane diol (216 g., 1 mole) was dissolved in 750 ml. of dry tetrahydrofuran and this solution was placed in one of the addition funnels. 1,3-dichlorotetramethyldisiloxane (203 g., 1 mole) was placed in the other addition funnel. Both reactants were added dropwise from the addition funnels. The reaction was exothermic and the reaction temperature was maintained at 20–60° C. during the course of the addition (75 minutes). Filtration of the reaction mixture to remove triethylamine hydrochloride, followed by fractionation of the filtrate produced 230 g. (66 mole percent yield based on moles of reactants used) of a cyclic trimer having the formula ($\phi_2$SiO)(Me$_2$SiO)$_2$ and having a boiling point of 123° C./1 mm. mercury.
 Calculated for C$_{16}$H$_{22}$Si$_3$O$_3$; 55.5% C, 6.3% H, 24.3% Si, molecular weight=346. Found: 55.1% C, 6.4% H, 24.5% Si, molecular weight=350.

*Example 6*

To a one-liter, 3-necked flask equipped with a stirrer, thermometer and addition funnel was added triethylamine (380 g., 0.376 mole), 1,7-dichlorooctamethyltetrasiloxane (60.1 g., 0.172 mole) and 50 ml. of freshly distilled tetrahydrofuran. Diphenylsilanediol (37.0 g., 0.172 mole) in 100 ml. of freshly distilled tetrahydrofuran was slowly added over a one hour period from the addition funnel to the flask contents. The temperature was maintained at 25° C. Filtration of the reaction mixture to remove triethylamine hydrochloride, followed by fractionation of the filtrate gave 26.7 g. (31 mole percent based on moles of reactants used) of the mixed cyclic pentamer (Me$_2$SiO)$_4$($\phi_2$SiO). This product had the properties of B.P. 125° C./0.2 mm. mercury and $n_D^{25}$=1.4772.
 Calculated for C$_{20}$H$_{34}$O$_5$Si$_5$: 48.5% C, 6.93% H, 28.3% Si. Found: 48.7% C, 7.0% H, 27.7% Si. Infrared spectrographic analysis was in accord with the proposed structure.

What is claimed is:
1. A process for the production of cyclic organosiloxanes of specific desired composition having mixed organo-substituents which comprises reacting in the presence of an inert solvent (1) an organosilicon diol compound selected from the class consisting of siloxane compounds having the formula HO(R$_2$SiO)$_n$H and silane compounds having the formula R$_a^1$R$_b^2$Si(OH)$_2$ wherein R, R$^1$ and R$^2$ are selected from the class consisting of monovalent hydrocarbyl radicals connected to silicon through a carbon-silicon bond and monovalent substituted hydrocarbyl radicals containing substituents free of active hydrogen, said monovalent substituted hydrocarbyl radicals connected to silicon through a carbon-silicon bond and having the substituents located at least two carbon atoms from the silicon atoms said substituents being selected from the class consisting of alkyl, cyano and nitro groups and wherein R$^1$ and R$^2$ can be the same or different radicals but at least one R$^1$ or R$^2$ radical is different from R, $a$ is an integer having a value from 0 to 2 inclusive, $b$ is an integer having a value from 0 to 2 inclusive, the sum of $a+b$ is 2, and $n$ is an integer having a value from 2 to 4 inclusive with (2) an organosilicon compound selected from the class consisting of siloxane compounds having the formula X(R$_2$SiO)$_m$SiR$_2$X and silane compounds having the formula R$_a^1$R$_b^2$SiX$_2$ wherein R, R$^1$, R$^2$, $a$ and $b$ are the same as defined above, X is a chloro radical, the sum of $a+b$ is 2 and $m$ is an integer having a value from 1 to 3 inclusive, wherein one of the reactants must be a siloxane and the other reactant must be a silane, and recovering the desired cyclic organosiloxane product.

2. A process for the production of cyclic organosiloxanes having mixed organo-substituents as set forth in claim 1 wherein the solvent is present in an amount from about 25 to about 80 volume percent based on total volume of solvent plus reactants.

3. A process for the production of cyclic organosiloxanes having mixed organo-substituents as set forth in claim 1 wherein the solvent is selected from the class consisting of acetone, benzene, xylene and tetrahydrofuran.

4. A process for the production of cyclic organosiloxanes having mixed organo-substituents as set forth in claim 1 wherein the process is carried out at a temperature below about 200° C.

5. A process for the production of cyclic organosiloxanes having mixed organo-substituents as set forth in claim 1 wherein the process is carried out at a temperature of about 0° C. to about 150° C.

6. A process for the production of cyclic organisiloxanes having mixed organo-substitutents as set forth in claim 1 wherein the organosilicon diol has the formula $HO(R_2SiO)_nH$ and the other reactant has the formula $R_2^1SiX_2$, wherein R, $R^1$, X and $n$ are defined as in claim 1.

7. A process for the production of cyclic organosiloxanes having mixed organo-substituents as set forth in claim 1 wherein the organosilicon diol has the formula $HO(R_2SiO)_nH$ and the other reactant has the formula $R_2^1SiCl_2$, wherein R, $R^1$ and $n$ are defined as in claim 1 and wherein the reaction is carried out in the presence of an HCl acceptor.

8. A process for the production of cyclic organosiloxanes having mixed organo-substituents as set forth in claim 7 wherein the HCl acceptor is triethylamine.

9. A process for the production of a cyclic organosiloxane having the formula:

$$(\phi_2SiO)(Me_2SiO)_3$$

which comprises reacting in the presence of an inert solvent and in the presence of an HCl acceptor diphenyldichlorosilane and dimethylsiloxane diol and recovering the desired cyclic organosiloxane product.

10. A process for the production of a cyclic organosiloxane having the formula:

$$(\phi_2SiO)(Me_2SiO)_3$$

which comprises reacting in the presence of an inert solvent and in the presence of an HCl acceptor diphenylsilane diol and an organochlorosiloxane having the formula $ClSiMe_2OSiMe_2OSiMe_2Cl$ and recovering the desired cyclic organosiloxane product.

11. A process for the production of a cyclic organosiloxane having the formula:

$$(\phi_2SiO)(Me_2SiO)_2$$

which comprises reacting in the presence of an inert solvent and in the presence of an HCl acceptor diphenylsilane diol and 1,3-dichlorotetramethyldisiloxane and recovering the desired cyclic organosiloxane product.

12. A process for the production of a cyclic organosiloxane having the formula:

$$(\phi_2SiO)(Me_2SiO)_4$$

which comprises reacting in the presence of an inert solvent and in the presence of an HCl acceptor diphenylsilane diol and 1,7-dichlorooctamethyltetrasiloxane and recovering the desired cyclic organosiloxane product.

References Cited
UNITED STATES PATENTS

| | | | |
|---|---|---|---|
| 2,684,379 | 7/1954 | Guillissen et al. | 260—448.2 |
| 2,954,391 | 9/1960 | Riley et al. | 260—448.2 |
| 3,032,528 | 5/1962 | Nitzsche et al. | 260—448.2 |
| 3,037,962 | 6/1962 | Hartung et al. | 260—448.2 |
| 3,133,110 | 5/1964 | Morehouse et al. | 260—448.2 |

OTHER REFERENCES

Pike: "Jour. Organic Chem.," vol. 26, January 1961, pages 232–236.

TOBIAS E. LEVOW, *Primary Examiner.*

SAMUEL H. BLECH, HELEN M. McCARTHY,
*Examiners.*

P. F. SHAVER, *Assistant Examiner.*